Patented Nov. 13, 1951

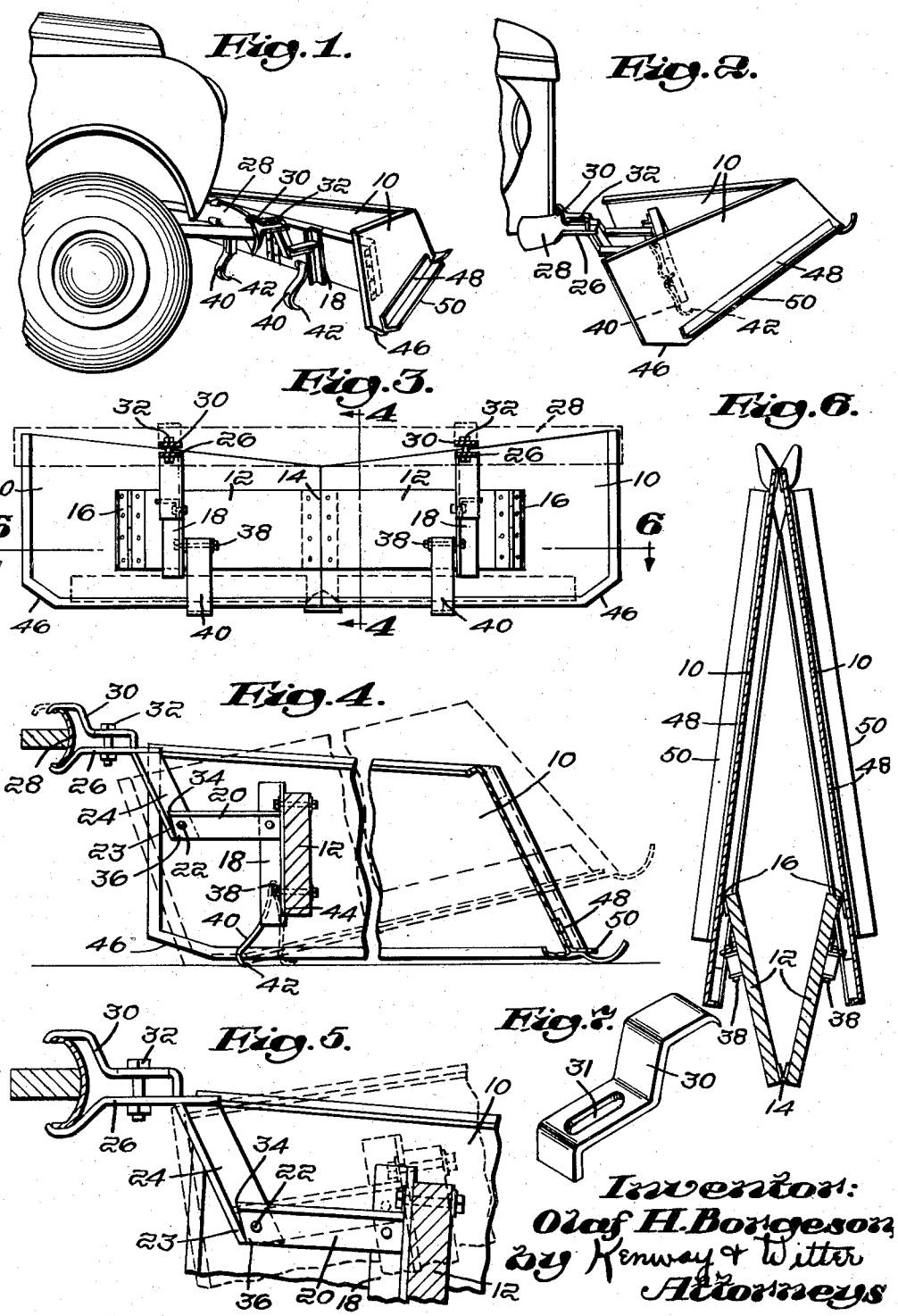

2,575,091

UNITED STATES PATENT OFFICE 2,575,091

SNOWPLOW

Olaf H. Borgeson, Hanson, Mass.

Application May 6, 1946, Serial No. 667,696

3 Claims. (Cl. 37—44)

This invention relates to snow plows and more particularly to certain improvements in the snow plow disclosed in my Patent 2,188,805. That plow is particularly adapted for use on small estates and the like and is operated by attachment to the bumper of an automobile. In snow plowing operations it is frequently necessary to move the plow rearwardly for various purposes and one object of my invention resides in the provision of improved means for facilitating this operation.

My invention contemplates the employment of suitable means, such as a pair of brackets, of such length and so hinged to the plow as to swing freely to the rear and drag on the ground when the plow is pushed forwardly and to assume an upright position and lift the plow from the ground when the plow is moved rearwardly. Plow propelling means is attached to the plow at an elevation above the brackets and is adapted to lift the plow on the brackets and tip its forward end upward about the brackets when the plow is pulled rearwardly. A further feature of the invention comprises the cutting away of the rear bottom corners of the mold boards to permit such rearward tipping movement and provide supporting runners for the plow in such tipped position.

Further novel features of the invention include stops for limiting downward and upward movement of the plow, improved means for attaching the plow to automobile bumpers of various widths and at suitable elevations for operating the plow, and an improved cutting blade attached to the bottom front edge of each mold board and extending forwardly therefrom. The production of an improved snow plow having these new and valuable features comprises a further object of the invention.

These and other features of the invention will be best understood and appreciated from the following description of a preferred embodiment thereof selected for purposes of illustration and shown in the accompanying drawings in which, Fig. 1 is a perspective rear view of my improved snow plow attached in operative position to the forward end of an automobile, Fig. 2 is a side elevation illustrating lifting of the plow when drawn rearwardly, Fig. 3 is a rear view of the plow in open position, Fig. 4 is a sectional view taken on line 4—4 of Fig. 3, Fig. 5 is a fragmentary enlarged view of a portion of Fig. 4, Fig. 6 is a plan section taken on line 6—6 of Fig. 3 and showing the plow in folded position, and Fig. 7 is a perspective view of a clamping element.

In the drawing 10 indicates two mold boards pivoted together at their forward ends for movement to the open position of Figs. 1-5 and the folded position of Fig. 6. A brace comprising two elements 12 hinged together at 14 and to the mold boards at 16 is provided for holding the mold boards in open position. The plow is propelled by attachment to the front or rear bumper of an automobile.

A pair of angle irons 18 is rigidly fixed to the brace elements 12 at opposite sides of the longitudinal center line of the plow and rigidly attached thereto and extending rearwardly are a pair of angle irons 20. Pivoted to the free ends of the parts 20 at 22 and extending upwardly and rearwardly therefrom are angle irons 24, and rigidly fixed to the top end of each iron 24 and extending rearwardly therefrom is a piece 26. The free end of the piece 26 is constructed to engage the bottom edge of a bumper 28 and cooperating therewith is a companion clamping piece 30 for engaging the top edge of the bumper, a bolt 32 being provided for clamping the pieces onto the bumper. The top edges of the bumpers vary somewhat in width and the top piece 30 is provided with an elongated bolt hole 31 permitting the piece to be longitudinally adjusted to fit the bumper, as illustrated in broken lines in Fig. 4.

The two parts 20 and 24 are so pivoted together at 22 that the plow is permitted a limited movement upward and downward for the purpose hereinafter described. The rear end corners of the piece 20 are arranged to contact with the angle flange 23 of the part 24 and provide stops at 34 and 36. The stops 34 limit upward movement of the plow and the stops 36 limit its downward movement. The pivot joint permits lifting of the plow to ride over rough obstructions and depressing movement to reach into depressions. The stops 34 however prevent undue lifting of the plow and the stops 36 prevent undue dropping of the plow should it ride over a relatively deep hole or depression.

It is frequently necessary to move the plow rearwardly and the following described means is provided for automatically lifting or tilting the plow for this purpose. Pivoted to the brace elements 12 on horizontal axes 38 extending transversely of the plow and at opposite sides of its longitudinal center are two brackets 40. These brackets are of a length to extend downwardly beyond the bottom of the plow and they are hinged to swing freely on said axes to the rear and drag on the ground when the plow is pushed forwardly and to assume an upright position and lift the plow from the ground when the plow is moved rearwardly. The free ends of the brackets are curved in a direction forwardly and rearwardly of the plow to provide plow supporting runners when the plow is in the lifted position, and the extreme ends 42 of the brackets have sharp points adapted to dig into the ground and cause the brackets to pivot forwardly to upright position when the plow is moved rearwardly. The brackets swing forwardly against the brace which serves as a stop at 44 to limit their forward movement to the upright position illustrated.

When the plow is drawn rearwardly the brackets 40 move to the upright position and the front end of the plow is tilted upwardly about the brackets as illustrated in Fig. 2. To permit this tilting movement and provide runners for the plow, I cut away the rear bottom corners of the mold boards at 46. It will be noted that the propelling means 20—24 are attached to the plow at an elevation above the pivot axes 38 of the bracket 40 thereby causing the plow to tilt upwardly as described.

The plowing operation is facilitated by the employment of an angle iron 48 fixed to the front face of each mold board along its bottom edge and having a cutting blade 50 extending forwardly therefrom. The cutting blade serves to loosen the snow for movement by the plow as will be apparent.

Having thus disclosed my invention what I claim as new and desire to secure by Letters Patent is:

1. A snow plow comprising a pair of mold boards united into an apex at their forward ends and diverging rearwardly therefrom, means for holding the mold boards in said diverging relation, plow lifting means hinged to the plow for pivotal movement on a horizontal axis extending transversely of the plow, plow propelling means attached to the plow, the plow lifting means being of a length to extend downwardly beyond the bottom of the plow and being hinged to swing freely on said axis to the rear and drag on the ground when the plow is pushed forwardly by said propelling means and to assume an upright position and lift the plow from the ground when the plow is moved rearwardly by said propelling means, and stop means preventing pivotal movement of the plow lifting means forwardly beyond said upright position, the plow lifting means being hinged to the plow intermediately of its front and rear ends and said propelling means being attached to the plow at an elevation above the pivot axis of the lifting means, the rear bottom corners of the mold boards being cut away and rearward movement of the plow by said propelling means being adapted to lift the plow on the lifting means and tip its forward end upwardly about the lifting means and bring said cut away corner portions into contact with the ground.

2. The snow plow defined in claim 1 in which the plow propelling means comprises two spaced brackets rigidly attached to the plow above and extending rearwardly beyond the plow lifting means and cooperating brackets pivoted on horizontal axes to the first named brackets and extending rearwardly therefrom for attachment to the bumper of a vehicle.

3. A snow plow comprising a pair of mold boards united into an apex at their forward ends and diverging rearwardly therefrom, a brace extending transversely of the plow between and connected to the mold boards rearwardly of said apex, two brackets hinged to the brace respectively at opposite sides of the center line of the plow on horizontal axes extending transversely of the plow, the brackets being of a length to extend downwardly beyond the bottom of the plow and being hinged to swing freely on said axes to the rear and drag on the ground when the plow is pushed forwardly by power contact with the brace and to assume an upright position and lift the plow from the ground when the plow is moved rearwardly by power contact with the brace, and two propelling elements attached to and extending rearwardly of the brace above said brackets and respectively at opposite sides of the center line of the plow, rearward movement of the plow by said elements being adapted to lift the plow on and tip it rearwardly about the brackets, and the rear bottom corners of the mold boards being cut away to permit such rearward tipping movement and provide supporting runners for the plow in such tipped position.

OLAF H. BORGESON.

REFERENCES CITED

The following references are of record in the file of this patent:

UNITED STATES PATENTS

| Number | Name | Date |
|---|---|---|
| 729,265 | Brazel | May 26, 1903 |
| 1,686,243 | Meyer | Oct. 2, 1928 |
| 1,925,397 | Meyer | Sept. 5, 1933 |
| 2,188,805 | Borgeson | Jan. 30, 1940 |